(12) United States Patent
Kilpatrick et al.

(10) Patent No.: US 7,168,182 B2
(45) Date of Patent: Jan. 30, 2007

(54) ANGLE TAPE

(76) Inventors: Terry Kilpatrick, 12600 Applewood La., Norman, OK (US) 73026; Daniel Gurka, 10901 S. Centennial Rd., Mustang, OK (US) 73064

(*) Notice: Subject to any disclaimer, the term of this patent is extended or adjusted under 35 U.S.C. 154(b) by 8 days.

(21) Appl. No.: 11/125,645

(22) Filed: May 10, 2005

(65) Prior Publication Data

US 2006/0254071 A1 Nov. 16, 2006

(51) Int. Cl.
*G01B 3/10* (2006.01)

(52) U.S. Cl. .......................... 33/770; 33/760

(58) Field of Classification Search ............... 33/471, 33/490, 757–760, 768, 770
See application file for complete search history.

(56) References Cited

U.S. PATENT DOCUMENTS

| 2,458,114 | A | * | 1/1949 | Storch | 33/490 |
|---|---|---|---|---|---|
| 2,649,784 | A | * | 8/1953 | Klimek | 33/490 |
| 2,711,030 | A | * | 6/1955 | Drew et al. | 33/758 |
| 3,087,251 | A | * | 4/1963 | Betz | 33/768 |
| 3,651,574 | A | * | 3/1972 | Burkart | 33/760 |
| 5,253,421 | A | * | 10/1993 | Landmark | 33/760 |
| 5,402,583 | A | * | 4/1995 | Komura | 33/758 |
| 5,669,149 | A | * | 9/1997 | Meitzler | 33/471 |
| 5,894,677 | A | * | 4/1999 | Hoffman | 33/758 |
| 5,915,807 | A | * | 6/1999 | Ilagan | 33/471 |
| 6,427,358 | B1 | * | 8/2002 | LeBon et al. | 33/758 |
| 6,978,550 | B2 | * | 12/2005 | Xieh | 33/471 |
| 2003/0009899 | A1 | * | 1/2003 | Ha | 33/770 |
| 2005/0155245 | A1 | * | 7/2005 | Panosian | 33/760 |

FOREIGN PATENT DOCUMENTS

GB 2101342 A * 1/1983

* cited by examiner

*Primary Examiner*—G. Bradley Bennett

(57) ABSTRACT

The invention is a rotatable attachment for a conventional tape measure. The attachment can be used to measure angles. This attachment increases the utility of the tape measure, allowing both angle measurement and distance measurement with one device.

1 Claim, 3 Drawing Sheets

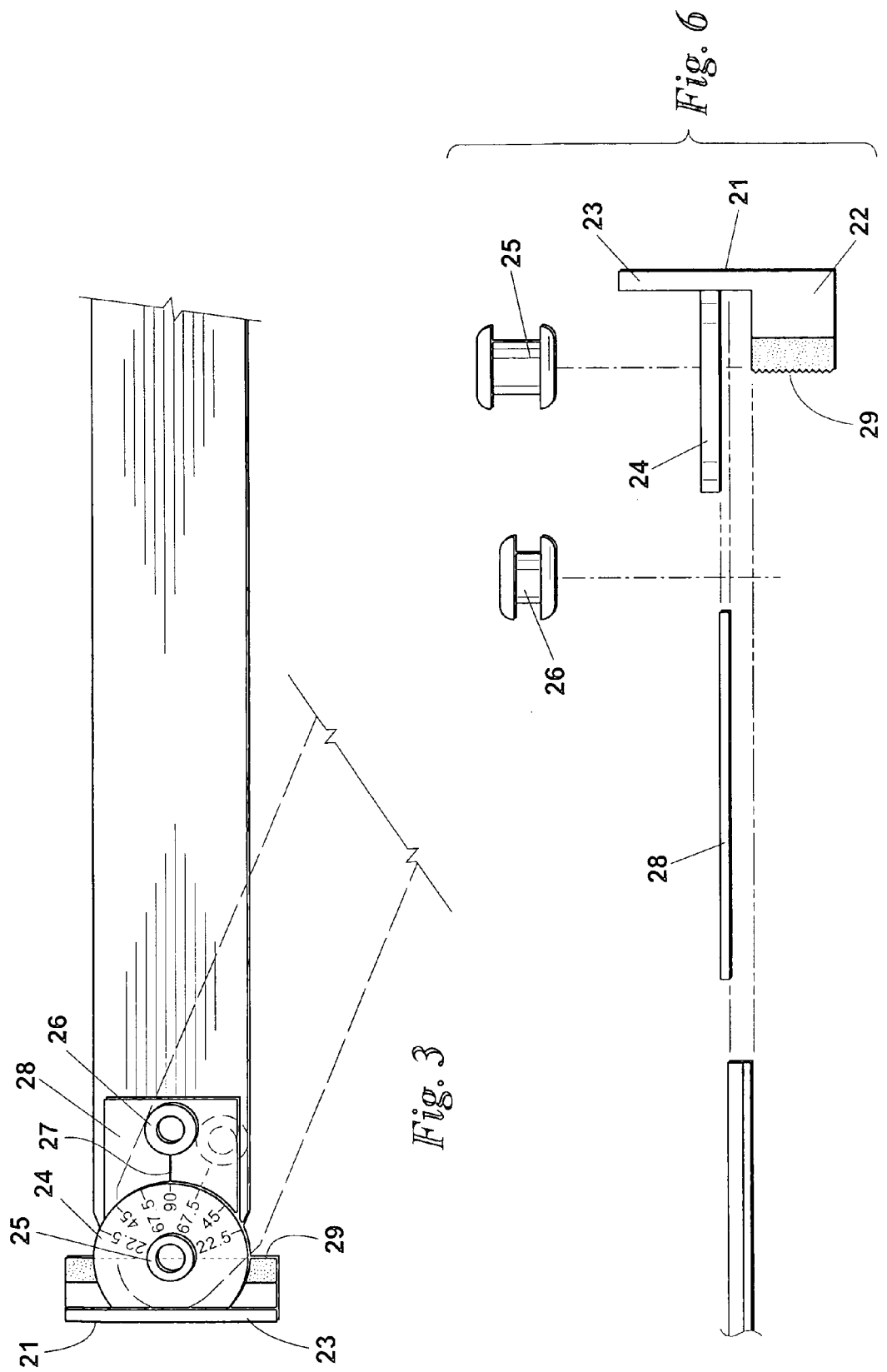

ANGLE TAPE

This invention claims no priority from previous related applications.

No federal funds were used in the development of this device

There is no microfiche appendix

BACKGROUND OF INVENTION

This invention was conceived to address the problems of measuring distance and angles in the carpentry and construction trades. This invention relates to tape measures, specifically the incorporation of attachments that increase the utility of the tape measure in carpentry and construction. This invention is a labor-saving device supplementing the standard methods for the measuring of distance and angles.

Construction workers and carpenters have a need for a simple device that can be used to measure distances and lay out angles. A common technique used by construction workers and carpenters is to use a tape measure to mark a distance, and a T-Square or carpenter's square to lay out the angle. This is cumbersome and time consuming and requires a certain degree of skill. In addition, the tape measure end tab is usually rigidly mounted, and does not swivel to grip the work surface edges, increasing the possibility of measurement errors.

The conventional tape measure relies on a thin, flexible steel tape, which has a upward transverse curvature. The flexible retractile steel tape unrolls from a slot in the tape measure housing. Said retractile steel tape has a metal end tab which prevents the tape from retracting irretrievably into the housing.

A carpenter's square is used to measure right angles and to calculate angles used in carpentry or construction. It requires some skill and experience to rapidly lay-out angles on a work surface.

There exists a need to easily and quickly measure distances and lay out angles using one instrument. In addition the present invention can be easily and quickly used by those not experienced in the construction and carpentry arts.

DESCRIPTION OF PRIOR ART

Tape measures, T-squares and carpenter's squares have been in use in carpentry and construction for many years, to layout angles and measure distances. Accurate measurements are necessary in the carpentry and construction fields. The ability to perform both angle and distance using one instrument would be valuable. Inventors have tried similar combinations in the past, but their devices have lacked the ability to quickly and precisely measure distance and angles.

For instance, U.S. Pat. No. 6,098,303, S. Vogel, Aug. 8, 2000, describes a tape measure, which incorporates a angle index in the housing, allowing the measurement of angles. However in use the tape must be turned sideways, which can cause problems in the accurate drawing of lines (the pencil line would be drawn using the weaker side of the tape), and the housing is substantially modified, which would cause problems in the storage and carrying of the tape measure.

U.S. Pat. No. 4,965,944, A. Kuze, Oct. 30, 1990, also incorporates a angle index marked on the tape measure housing, has the same problem in drawing the lines, but the tape measure can be carried and stored with more ease.

U.S. patent application Pub. Ser. No. 10/141,266, D. Elder et al, Feb. 12, 2004, describes a tape measure with two attachments, a marker at the extended end of the tape, and pivot attached to the tape measure housing, which can be used, with a indexed pivot point, to measure distances and angles from a central point. However, this device is more suited as a compass for drawing circles of varying diameters, rather that measuring a distance and angle to any point of a work surface.

U.S. Pat. No. 4,044,469, D. Posey, Aug. 30, 1977, describes an angle measuring device which can be attached to a tape measure. This angle measuring device can slide along the extended tape, and be used to lay out a desired angle along the tape measure. This device is more suited to using on horizontal surfaces, and not suited for rapid measurement of distances and angles as used in the carpentry and construction trades.

U.S. Pat. No. 4,731,933, D. Cope, Mar. 22, 1988, describes a compass and chalkline combination, which allows the rapid and easy laying out of angles, and marking of lines on the work surface. However, there is no provision for the combining of measuring distances and angles.

U.S. Pat. No. 5,671,543, T. Sears, Sep. 30, 1997, describes a marking attachment for a tape measure, attached to the tape measure housing, allowing the precise and easy marking of measurements. However, there is no provision for measuring angles.

U.S. patent application Publ. Ser. No. 10/659,996 W. Rafter, Mar. 18, 2004, describes an attachment to the tape measure, which when attached to the extended end of the tape, allows a stronger connection to be made to the work surface.

U.S. Pat. No. 6,370,790, B. Stenger, Apr. 16, 2002, Describes an attachment to the tape measure, which when attached to the end of the extended tape, contains a pin, which can be pressed into the work surface, holding the tape securely, allowing the measurement of longer distances.

U.S. Pat. No. 5,349,760, V. DeVito, Sep. 27, 1994, describes an attachment to the tape measure, which when attached to the end of the extended tape, provides a wider edge to the end piece, allowing a stronger connection to the edge of the work surface. The end piece also contains a hole through which a pin or nail can be inserted allowing the device to be used as compass and to draw circles.

U.S. Pat. No. 6,115,931, S. Arcand, Sep. 12, 2000, describes an attachment to the tape measure, which when attached to the end of the extended tape, has a swiveling end piece and slots for the attachment of various pins or markers. However, there is no provision for the measurement of angles.

U.S. Pat. No. 4,023,277, C. Fizer, May 17, 1977, Describes an attachement to the measure, which when attached to the end of the extended tape, contains a marker, or chalk, which extends through the tape, and can be used as a extendable compass, to draw circles on the work surface.

None of the previously described devices have been used to quickly and accurately measure angles and distances, as used in the carpentry and construction trades. The present invention greatly enhances the versatility of the conventional tape measure, replacing two instruments, and measurements and calculations, with one rapid, convenient measurement.

BRIEF SUMMARY OF INVENTION

This invention is an attachment for a conventional tape measure which allows the user to quickly and easily measure a specified distance and angle on a work surface. The attachment is hereinafter referred to as an end piece. The end piece comprises of an indexed dial and end tabs. The end tabs extend above and below the steel tape. This end piece is attached to the extended end of the retractile steel tape using a rotational coupling. This rotational coupling connects the end piece to the underside of the steel tape, by a fastener through the center of the indexed disk. A reinforcing shim and fastener is added to increase the durability of the rotational coupling. An index line is marked on the reinforcing shim as a reference for the indexed dial. The end piece is the same width as the surface of the tape, so that when the tape is retracted into the tape measure housing, the end piece seamlessly fits into the housing, thus enabling the tape measure to be carried and stored easily.

When used in the conventional manner the tape measure is used to measure distances on a work surface. When the tape measure is turned over, the end tab that extends above the tape can be used to engage the edge of the work surface. The indexed dial is then visible to the user, and the desired angle can be determined. The indexed dial is marked with angles commonly used in carpentry and construction, that is 22.5, 45, 67.5 and 90 degrees. The rotational coupling allows the worker to measure almost 90 degrees to the left or right of a center line.

BRIEF DESCRIPTION OF DRAWINGS

1.
FIG. 3. Bottom view showing retractile tape extended from tape measure, with described device attached, and degree markings and index line.
4.
FIG. 6. Side view of the described device not attached to the retractile tape.

DETAILED DESCRIPTION OF INVENTION

Figure 2:
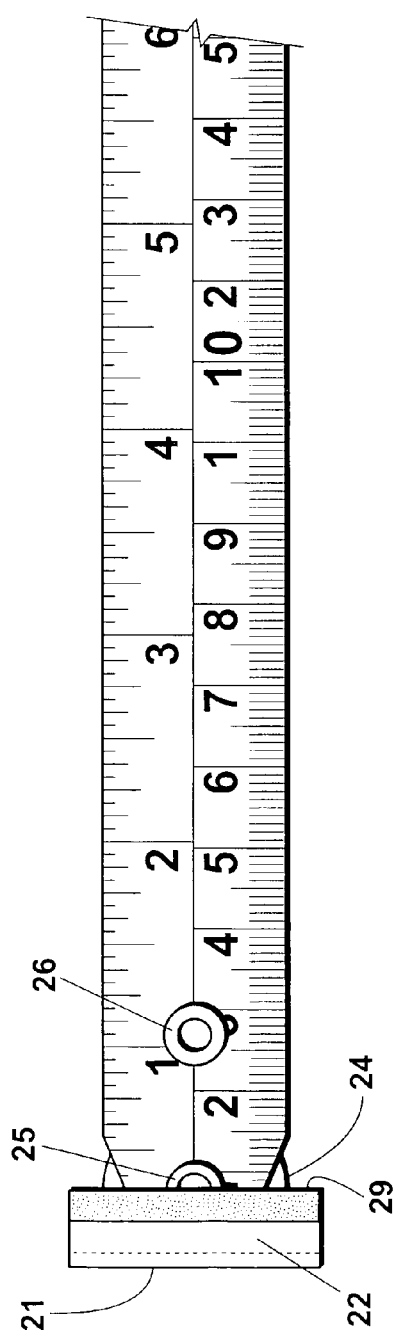
FIG. 2. Top view showing retractile tape extended from tape measure with described device attached.
3.

The invention herein is an attachment for a conventional tape measure. The attachment replaces the conventional tab on the distal end of the retractile steel tape extended from a conventional tape measure. The attachment comprises an end piece 21 with tabs which extend above and below the distal end of the retractile steel tape, an indexed dial 24 perpendicular to the aforesaid tabs, and a rotatable coupling 25 connecting the end piece to the extended end of the retractile steel tape.

The aforesaid tabs extend approximately ½ inches, more or less, above and below said tape. The tab 22 that extends above the tape is approximately ¼ inch thick, more or less. The end of the tape is rounded to allow the end piece to rotate about the end of the tape. This increased thickness of the tab allows the rounded edge of the tape to extend past the edge of the work surface, and thus allowing a complete non-void scribe up to the edge of the work surface. The tab that extends above the tape has a non-skid material 29 applied to surface facing the tape measure housing. This non-skid material grips the edge of the work surface enabling the worker to accurately measure angles without the tab slipping. The tab 23 that extends below the steel tape functions similarly as the tab on a conventional tape measure.

The indexed dial 24 is marked with angles of 22.5, 45, 67.5 and 90 degrees. These are commonly used angle measurements in construction and carpentry. Other angle markings can be used if an application so warrants. The index dial is affixed permanently to the end piece, perpendicular to the end tabs. When the device is attached to the steel tape, the index dial is on the underside of said tape. An index line 27 is also marked on the underside of said tape. The angles on the index dial can be referenced to the index line, allowing the worker to precisely lay out the desired angles on the work surface.

The rotatable coupling allows the attachment to rotate about the end of said tape. The rotatable coupling is attached to the center of the index dial such that the index dial is on the bottom side of said tape. A reinforcement shim 28 can be used to strengthen the rotatable coupling. This consists of a shim and a rivet, a non-rotatable fastener 26, attached to the underside of the tape and the rotatable coupling fastener 25. The rotatable coupling allows the measurement of almost 90 degrees to left or right of center.

In use, the top side of the tape is used to measure distances. To measure angles, the tape is turned over, and the index dial then becomes visible, and can be used to measure angles. The dial is indexed for angles commonly used in carpentry and construction. An advantage of turning the tape over is, that the transverse curvature of the tape is reversed, and the edge of the tape is down on the work surface, enabling the user to accurately draw a straight line along the tape's edge on the work surface.

Figure 1:
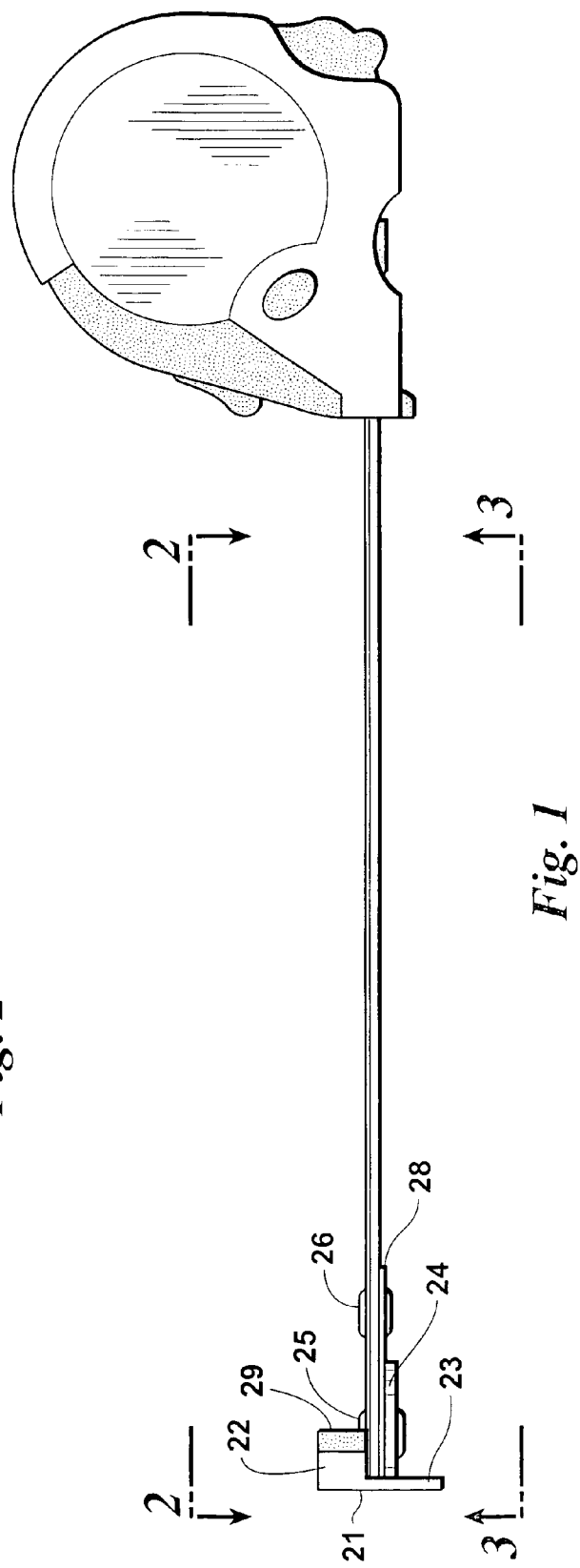
FIG. 1. Side view of a conventional tape measure, with retractile tape extended, and described device on the end.
2.
Figure 4:
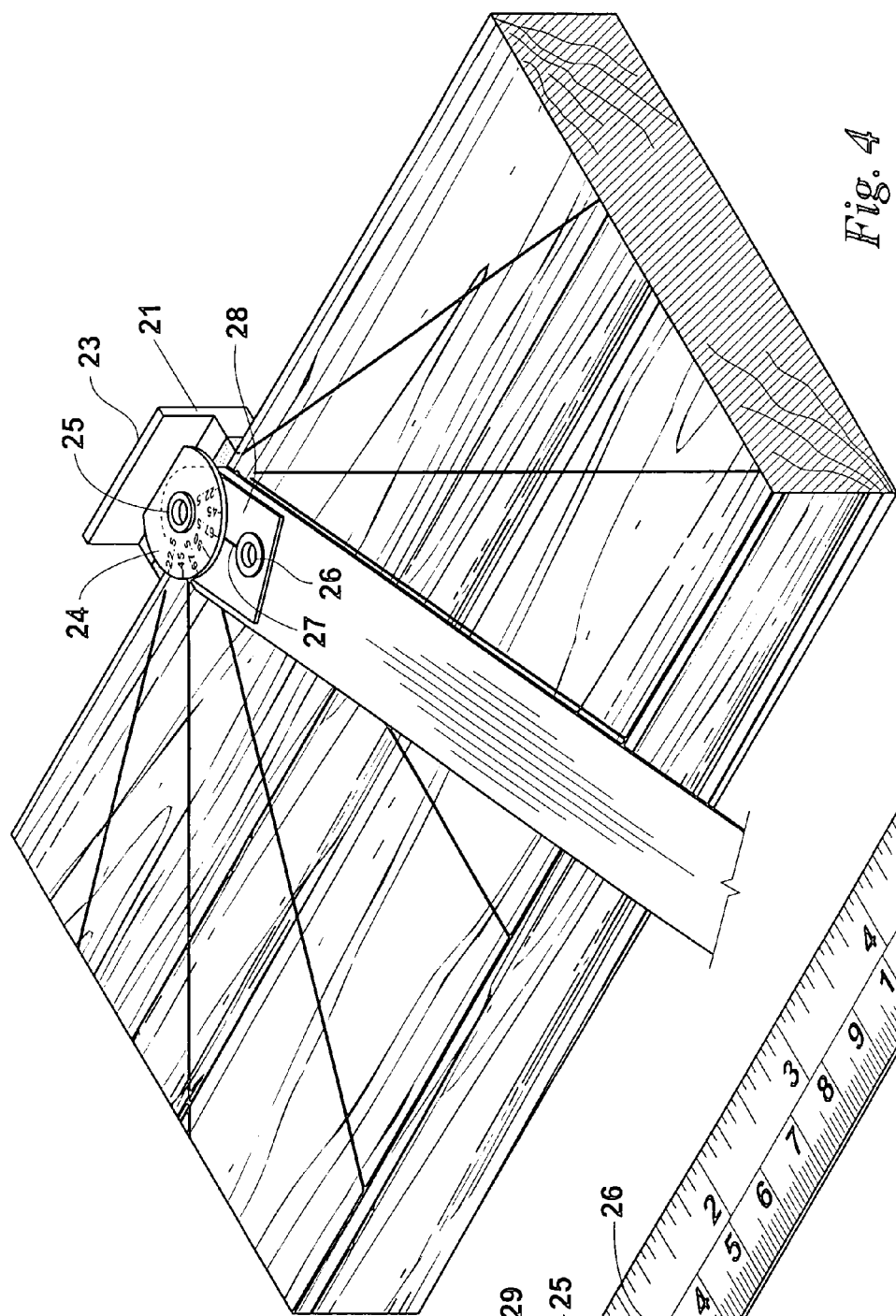
FIG. 4. Described device in place on a work surface, showing various angles marked out on work surface.
5.
Figure 5:
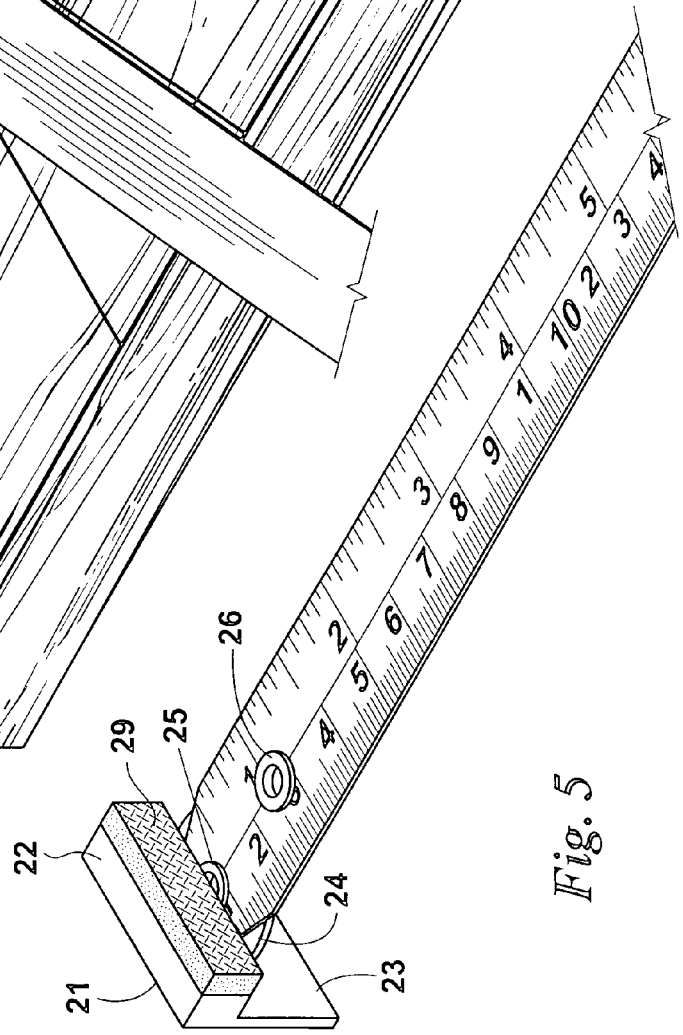
FIG. 5. Diagonal view of extended retractile tape from tape measure with described device attached.
6.

Referring to the drawings, FIGS. 1 through 6, the preferred embodiment of the described device, the Angle Tape, is as shown. FIG. 1 is a side view showing the end piece 21 with the tab extending above 22 and below 23 the tape, note that there is a rotational coupling 25, a fastener connecting the end piece and index dial to said tape. FIG. 2 is a top view of said tape, showing a fastener, 25 connecting the rotatable end piece to said tape, and the top of the end piece. FIG. 3 is a bottom view of said tape, showing the rotatable end piece with tab, with the indexed dial 24, and the index line 27 shown inscribed on the reinforcement shim 28 with non rotatable fastener 26. FIG. 4 shows the preferred embodiment of this invention in use to measure an angle on a work surface. FIG. 5 is a diagonal view of the preferred embodiment of the described device. FIG. 6 is a side view of the described device not attached to the steel tape.

In the preferred embodiment, the tape measure with the Angle Tape, operates as follows; the worker, having measured and marked the desired distance on the work surface, inverts the tape measure exposing the angle index dial 24 and index line 27, and aligns desired angle, and inscribes that angle on the work surface. The transverse curvature of the steel tape, which in normal use, curves upward, when the tape is reversed, causes the edges to press down on the work surface. This downward pressure on the edges of the tape enables the worker to make a more precise marking on the work surface. It is visualized that when the Angle Tape becomes popular, that the tape measure manufacturers will make distance markings on both sides of the steel tape.

The advantages of the described device, the Angle Tape, are (1) the device can be used to measure angles and to measure distances quickly and easily, (2) the device when installed on a conventional tape does not interfere with the normal use of said tape measure, (3) the use of the inverted tape, with the transverse curvature of the tape pressing against the work surface, increases the accuracy of scribing a line on the work surface, (4) the device seamlessly fits onto the tape measure, and allowing the tape measure to be stored in a normal manner.

What is claimed is:

1. A tape measure with a rotational end piece, comprising:

a housing for containing a tape, said tape being extendible from said housing and said tape further including a rounded end;

a substantially rectangular, flat reinforcement shim which includes an indicator, said reinforcement shim is connected to the end of the tape by first and second rivets, said rivets are aligned along the tape in the center of the tape such that the first rivet is closer to the housing than the second rivet when the tape is extended;

a substantially circular, flat dial connected to the shim by the second rivet, said dial is marked with angle indicia;

an end piece perpendicularly attached to the dial, said end piece further including upper and lower tabs;

whereby the end piece may be rotated relative to the tape by pivoting the end piece about the second rivet such that an angle is indicated by the dial and the indicator.

* * * * *